United States Patent [19]

Jho et al.

[11] Patent Number: 5,496,475
[45] Date of Patent: Mar. 5, 1996

[54] LOW VISCOSITY POLAR-SOLVENT FIRE-FIGHTING FOAM COMPOSITIONS

[75] Inventors: Chang H. Jho, Dobbs Ferry; Yung Loh, Woodside; Karl F. Mueller, New York, all of N.Y.

[73] Assignee: Ciba-Geigy Corporation, Tarrytown, N.Y.

[21] Appl. No.: 969,622

[22] Filed: Oct. 30, 1992

[51] Int. Cl.$^6$ ............... A62D 1/00; A62D 1/02
[52] U.S. Cl. ............... 252/2; 252/3; 252/8.05
[58] Field of Search .................. 252/2, 3, 8.05

[56] References Cited

U.S. PATENT DOCUMENTS

| | | | |
|---|---|---|---|
| Re. 31,030 | 9/1982 | Hisatsuka et al. | 435/101 |
| 3,354,084 | 11/1967 | Katzer | 252/2 |
| 3,407,138 | 8/1968 | Harper et al. | 252/2 |
| 3,658,734 | 4/1972 | Pettitt . | |
| 3,957,657 | 5/1976 | Chiesa, Jr. | 252/3 |
| 4,060,132 | 11/1977 | Chiesa, Jr. | 169/47 |
| 4,060,489 | 11/1977 | Chiesa, Jr. | 252/3 |
| 4,149,599 | 4/1979 | Chiesa, Jr. | 169/47 |
| 4,304,572 | 12/1981 | Wiese et al. | 44/51 |
| 4,306,979 | 12/1981 | Tsuji | 252/3 |
| 4,387,032 | 6/1983 | Chiesa, Jr. | 252/3 |
| 4,420,434 | 12/1983 | Falk | 260/501.12 |
| 4,460,480 | 7/1984 | Kleiner | 252/805 |
| 4,464,267 | 8/1984 | Chiesa, Jr. | 252/8.05 |
| 4,584,339 | 4/1986 | Lundberg et al. | 524/516 |
| 4,585,820 | 4/1986 | Defago et al. | 524/232 |
| 4,610,311 | 9/1986 | Bronner et al. | 169/45 |
| 4,675,026 | 6/1987 | Riemer et al. | 44/51 |
| 4,786,198 | 11/1988 | Zgambo | 401/142 |
| 4,859,349 | 8/1989 | Clark et al. | 252/3 |
| 4,978,460 | 12/1990 | Von Blucher | 252/252 |
| 4,999,119 | 3/1991 | Norman et al. | 252/3 |
| 5,055,209 | 10/1991 | Bridges et al. | 252/8.51 |
| 5,085,786 | 2/1992 | Alm et al. | 252/8.05 |
| 5,218,021 | 6/1993 | Clark et al. | 524/56 |

FOREIGN PATENT DOCUMENTS

| | | |
|---|---|---|
| 0019584 | 11/1980 | European Pat. Off. . |
| 0346097 | 12/1989 | European Pat. Off. . |
| 2206958 | 6/1974 | France . |
| 3716304 | 11/1988 | Germany . |
| 1071660 | 6/1967 | United Kingdom . |
| 1422438 | 1/1976 | United Kingdom . |
| 1435200 | 5/1976 | United Kingdom . |

OTHER PUBLICATIONS

Research Disclosure, Feb. 1979, p. 75.
JP59044277 Abstract.

*Primary Examiner*—Philip Tucker
*Assistant Examiner*—Joseph D. Anthony
*Attorney, Agent, or Firm*—Kevin T. Mansfield

[57] ABSTRACT

Low viscosity, concentrated aqueous solutions of polysaccharide gums are prepared using certain water-soluble, anionic copolymers as viscosity reducers. These low viscosity polysaccharide gum solutions are used in the formulation of low viscosity polar-solvent fire-fighting foam compositions, especially "3×3" ("three by three") concentrates. The low viscosity compositions of the present invention are found to have exceptional stability as well as significantly improved fire-fighting performance.

19 Claims, No Drawings

LOW VISCOSITY POLAR-SOLVENT FIRE-FIGHTING FOAM COMPOSITIONS

BACKGROUND OF THE INVENTION

According to an international foam market survey, "Fire Fighting Foam Concentrates," by IMR International in 1992 the use of polar-solvent fire-fighting foam concentrates is becoming increasingly wide-spread in the fire-fighting industry throughout the world because of their effectiveness on various types of flammable solvents and fuels. This type of foam concentrate is also known in the fire-fighting industry as "alcohol-resistant aqueous film forming foam (AR-AFFF)," "alcohol-resistant concentrate (ARC)," "alcohol type concentrate (ATC)," or simply "multipurpose foam." The same survey reports that "alcohol-resistant AFFF is the most widely used type of concentrates in the USA in terms of value." Although these products are referred to as "polar-solvent" or "alcohol" resistant concentrates, they are generally designed to extinguish fires of both polar, hydrophilic liquids such as alcohols and nonpolar, hydrophobic fuels.

Polar-solvent fire-fighting foam concentrates generally contain as the key active components perfluoroalkyl surfactants (hereafter referred to as perfluorosurfactants), non-fluorosurfactants and water-soluble or swellable polymeric materials. They also often contain water-soluble solvents as foam stabilizers and other additives to accomplish specific tasks such as corrosion inhibition. The perfluorosurfactants, when used along with hydrocarbon surfactants, provide film-forming characteristics on the surface of a non-polar hydrophobic liquid. Fire-fighting foam concentrates whose performance depends only on their aqueous film-forming properties and which are useful on nonpolar liquids and fuels are referred to as AFFF (Aqueous Film Forming Foam) concentrates. U.S. Pat. No. 5,085,786 describes the state of the art and various perfluorosurfactants and non-fluorosurfactants typically used in the formulation of AFFFs. The use of AFFF agents, however, is limited to only non-polar liquid fires. They are ineffective on polar liquids which are either completely or partially miscible with water because the foam becomes destabilized when it comes in contact with such liquids. This is why polar-solvent fire-fighting foam concentrates also generally contain as a key component polymeric materials, typically polysaccharides.

Chiesa et. al. in their pioneering patents, for example, U.S. Pat. No. 4,060,489, disclose that water soluble (swellable) thixotropic polysaccharide "gums" cause the aqueous foam to form a gelatinous "mat" or "membrane" when it comes in contact with a polar, hydrophilic liquid. The formation of the membrane is caused by the fact that the polysaccharides are generally insoluble in flammable polar, hydrophilic liquids such as alcohols and ketones. The lack of solubility causes the hydrated (swollen) polysaccharide molecules to precipitate out of the foam, which eventually results in the formation of a floating gelatinous membrane at the interface between the foam and the polar liquid. This membrane acts as a diffusion barrier toward the fuel liquid and vapor and protects the rest of the foam mass from breaking. Hence it greatly increases the foam stability and consequently the fire-extinguishing effectiveness. The fire-fighting effectiveness of this membrane depends mainly on its thickness and the degree of hydration or swelling of the polysaccharide gums used.

U.S. Pat. Nos. 3,957,657; 4,060,132; 4,060,489; 4,149,599; 4,306,979; 4,387,032; 4,420,434; 4,464,267; 4,859,349 and 4,999,119 disclose polar-solvent fire-fighting compositions containing perfluorosurfactants, non-fluorosurfactants and polysaccharide gums.

The polysaccharide gums commonly used in commercially available polar-solvent foam concentrates are various grades of xanthan gums, the trade names of which include Rhodopol, Kelco, Keltrol, such as Keltrol BT and Keltrol RD, Actigum, Kelzan, Cecalgum and Galaxy, to name a few. Kelco K8A13, which is a special blend of polysaccharides is also commonly used. Other types of gums useful for the practice of this invention include rhamsan gum, such as Kelco K1A112 and welan gum. Kelco products are manufactured by Kelco, a Merck company.

Polar-solvent fire-fighting foam concentrates are typically formulated to be diluted (proportioned) to different concentrations for use on different types of fires. For fires involving nonpolar fuels such as hydrocarbon liquids, the concentrates are proportioned at the time of application through the foam nozzle to the 3% level (3 parts concentrate with 97 parts fresh or salt water). Fires involving polar solvents require a dilution to 6% (6 parts concentrate and 94 parts water). These products are known in the industry as "3×6" ("three by six") products.

Recent advances in polar-solvent fire-fighting formulation technology have made it possible to formulate concentrates that can be diluted at a single proportioning level of 3% for all uses. These products are known as "3×3" ("three by three") products. They require nearly twice as much polysaccharide gum and other active ingredients as the 3×6 formulations in order to provide the same fire extinguishing performance on polar solvents. Among the well known advantages of these new 3×3 products are savings in storage space, and savings in cost through the reduced usage level of the concentrate. These products can also eliminate the need on the part of the fire fighters to identify the fuel type in emergency situations, because only one, single proportioning setting at 3% is required for either polar solvent or hydrocarbon fires. With the 3×6 type of products, the fuel type, i.e. whether the burning fuel is a polar, hydrophilic liquid or a hydrocarbon, has to be identified before the fire fighter can properly set the foam proportioning device at either 6% or 3%.

One of the most serious disadvantages of the 3×3 type of polar-solvent compositions is their extremely high viscosities. These high viscosities, which range from 4000 to 5500 cP in the products currently available on the market, are caused by the high level of polysaccharide gums, typically 1.2–2.0% in the products. In fact, those skilled in the art of formulating polar-solvent fire-fighting concentrates using polysaccharide gums would like to be able to use more of the gums to improve the fire-fighting performance. Some polysaccharide gums have excellent hydration properties, which are important for fire-fighting performance as mentioned earlier, but because of the impractically high viscosities of formulations containing them, one is forced to choose either less hydrating gums or use decreased amounts, thus compromising the quality of fire-fighting performance.

Low viscosity products would provide the following advantages:

Easier handling of pumping, eduction and transport of the concentrate, especially during the winter time when the viscosity build-up at low temperature can lead to a gelled condition. Gelled concentrates are not usable.

Rapid dilution and thereby accurate proportioning of the concentrate. If the viscosity is sufficiently low (to be considered as nearly a Newtonian system), this type of polar-solvent foam concentrate can be handled like AFFF concentrates, i.e. it can be directly added to the water (known as a "direct dumping" method in the fire fighting industry) without the use of an eductor.

No requirement for additives to speed up the dissolution of polysaccharide gums in water: For example, Chiesa (U.S. Pat. No. 4,149,599) suggested using urea for this purpose.

Freeze-protected products can be formulated. Due to the extremely high viscosity at freezing temperatures, current products cannot be formulated as such.

Only a few documented efforts or attempts have been found in the literature to reduce the viscosity of polysaccharide-containing polar-solvent fire-fighting foam concentrates. U.S. Pat. Nos. 4,060,489 and 4,387,032, for example, disclose the use of urea, thiourea, or certain inorganic salts to reduce the viscosity. No teachings have been found on the subject of reducing the viscosity of the 3×3 type of products. Several methods to reduce the viscosity have been found, all based on the control of the degree of swelling of the polysaccharide gum. Inorganic salts such as sodium or ammonium chloride or acetate, for example, were found to limit the swelling of the gum in a typical polar-solvent fire-fighting concentrate. However, the degree of viscosity reduction by this method is not as large as by the method of this invention. Certain solvents such as butyl carbitol can also be used to limit the swelling of a gum, and thus reduce the solution viscosity. This method requires a large amount of the solvent to reduce the viscosity significantly, which is unacceptable environmentally. Both methods, however, suffer from the fact that the concentrates containing either the salts or large amounts of solvents do not have either good dispersion stability, or more importantly, good storage stability. Typically, the partially swollen gum particles separate out of the formulation on standing either at room temperature or at elevated temperature, thus rendering the concentrates useless.

Another way of reducing the viscosity is obviously by the reduction of the polysaccharide gum level so that a manageable viscosity can be obtained. Reducing the gum level, however, compromises the fire fighting performance of the formulation because the amount of swollen polysaccharide is directly related to the thickness and therefore the effectiveness of the aforementioned membrane. Szonyi and Cambon in *Fire Safety Journal,* Vol. 16 (1990), 353–365, have recently developed a method of chemically modifying a polysaccharide gum, specifically a xanthan gum, using a fluorochemical which chemically reacts with the gum. They teach that this fluorinated xanthan gum is more effective than an unmodified gum. Therefore, it can be used at a lower level, which would lead to a lower viscosity in the formulated concentrate. However, they do not mention the extent of viscosity reduction.

In addition to the above methods, use of alkyl polyglycosides has been recently disclosed in U.S. Pat. No. 4,999, 119 to help reduce the required amounts of polysaccharides and to thereby lower the viscosity of polar-solvent fire-fighting foam concentrates. We have now discovered that small amounts of certain anionic, water-soluble copolymers can greatly reduce the viscosity of viscous aqueous solutions of polysaccharide gums. As a further extension of this discovery, we have also discovered that the low viscosity polysaccharide gum solutions can be used in the formulation of extremely low viscosity polar-solvent fire-fighting foam concentrates, especially 3×3 formulations, without the aforementioned instability problems and without compromising fire-fighting performance. Up to a 40-fold reduction in viscosity was found possible with various 3×3 concentrates made with different types of polysaccharide gums. The anionic copolymers of were also found to significantly improve fire-fighting performance, especially on acetone fires.

No teachings have been found which describe the use of water-soluble, anionic copolymers to reduce the viscosity of either viscous polysaccharide gum solutions in water or in polar-solvent fire-fighting foam concentrates. However, these types of copolymers have been used in the past to accomplish the opposite, i.e. to increase the viscosity of various industrial formulations, as discussed further on.

DETAILED DISCLOSURE

The present invention relates to reduced viscosity aqueous compositions comprising a polysaccharide gum and a viscosity-reducing amount of a water-soluble, anionic copolymer, and to a method of producing an aqueous solution of a polysaccharide gum having a reduced viscosity by adding said polysaccharide gum to an aqueous solution of an effective amount of a water-soluble, anionic copolymer. This is one aspect of this invention. It further relates to reduced viscosity aqueous polar-solvent fire-fighting foam compositions comprising a polysaccharide gum and a viscosity-reducing amount of a water-soluble, anionic copolymer, and to a method of producing a reduced viscosity polar-solvent fire-fighting foam concentrate, particularly 3×3 formulations, by adding a polysaccharide gum, to an aqueous solution of an effective amount of a water-soluble, anionic copolymer. By reduced viscosity is meant a viscosity that is lower than it would be in the absence of the copolymer. This is another aspect of this invention.

Water-soluble, anionic copolymers useful in the present invention are preferably random or block copolymers containing units of the formula

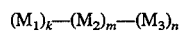

$$(M_1)_k\text{---}(M_2)_m\text{---}(M_3)_n$$

where $M_1$ is a radical of a vinyl mono- or dicarboxylic acid or a salt thereof, $M_2$ is a radical of a water soluble acrylamide, methacrylamide or vinylamide, $M_3$ is a radical of one or more other copolymerizable monomers selected of the group consisting of acrylates, methacrylates, vinyl esters, vinyl ethers and styrene, k is 0.05 to 0.50, m is 0.30 to 0.95 and n is 0 to 0.50, where k, m and n are the weight fractions of the respective monomers and the sum of k, m and n is 1.00.

Anionic copolymers of this invention are uncross-linked and therefore truly water soluble polymers in both acid and salt form unlike some cross-linked polymer products commercially promoted as "water-soluble" polymers. These cross-linked polymers are generally water insoluble (dispersible) in acid form but water-swellable in salt form.

The weight-average molecular weight range of the copolymers useful for the present invention was found to be from 1,500 to 750,000, preferably 10,000 to 250,000 mass units as determined by gel permeation chromatography.

Monomers for $M_1$ are typically acrylic acid, methacrylic acid, maleic, fumaric and itaconic acid and salts thereof. Suitable salts are those of the alkali metals such as sodium, potassium or lithium, or ammonium and amine salts.

Preferred monomers for $M_1$ are acrylic and methacrylic acid, with the latter being most preferred.

Monomers for $M_2$ are typically acrylamide, methacrylamide, N-methylacrylamide, N-ethylacrylamide N-methylmethacrylamide, N,N-dimethylacrylamide, N,N-diethylacrylamide, N,N-dimethylethylacrylamide, N-propyl- and N-isopropylacrylamide, and N-vinylpyrrolidone and N-vinylacetamide, and amides substituted by hydroxyalkyl groups such as N-(hydroxymethyl)-acrylamide, N-(3-hydroxypropyl)-acrylamide and N-(2-hydroxyethyl)-methacrylamide.

Preferred monomers for $M_2$ are acrylamide, N,N-dimethylacrylamide and N-vinylpyrrolidone, with N,N-dimethylacrylamide being most preferred.

Typical co-monomers for $M_3$ are linear or branched $C_1$–$C_8$-alkylacrylates and -methacrylates, or $C_3$–$C_7$-cycloaliphatic acrylates or methacrylates; examples are methyl, ethyl and 2-ethylhexyl acrylate, and methyl, t-butyl and cyclohexyl methacrylate. Also useful are phenyl or benzyl acrylate and vinyl esters such as vinyl acetate and vinyl propionate, vinyl ethers such as methyl, ethyl and butyl vinyl ether, and styrene and alpha-methyl styrene. Preferred comonomers for $M_3$ are methyl methacrylate, methyl acrylate and styrene.

Mixtures of monomers for $M_1$, $M_2$ and $M_3$ are also within the scope of this invention.

Useful copolymer compositions are those wherein the weight percent ratio of $M_1$ to $M_2$ is from 95/5 to 55/45 and $M_3$ is zero. Preferred are copolymer compositions wherein $M_1$ is a radical of acrylic or methacrylic acid, 10–30% by weight, $M_2$ is a radical of N,N-dimethylacrylamide or N-vinylpyrrolidone, 70–90%.

Also preferred are compositions wherein $M_1$ is a radical of maleic acid, 5–30% by weight, $M_2$ is a radical of N,N-dimethylacrylamide or N-vinylpyrrolidone, 50–95%, and $M_3$ is a radical of styrene or methylmethacrylate, 0–30%, or wherein $M_1$ is a radical of acrylic or methacrylic acid, 10–30% by weight, $M_2$ is a radical of acrylamide, 35–80%, and $M_3$ is a $C_1$–$C_4$-alkyl acrylate or methacrylate, or styrene, 0–45%.

Most preferred copolymer compositions are those wherein $M_1$ is a radical of methacrylic acid, 15–25% by weight, $M_2$ is a radical of N,N-dimethylacrylamide, 85–75% and $M_3$ is a radical of zero, or $M_1$ is a radical of methacrylic acid, 15–25% by weight, $M_2$ is acrylamide, 40–70% and $M_3$ is a radical of methyl acrylate or methacrylate, 15–40%.

Some polymers useful for the practice of this invention are commercially available under the trade names of Cyanamer (from American Cyanamid) and Photofloc (Neutron Products Inc.). Among the most useful Cyanamers are those which are anionic polyacrylamides containing varying degrees of anionic content, such as Cyanamer A-100L.

The concentration of the water-soluble, anionic copolymers useful for the practice of this invention varies depending mainly on the type of the polysaccharide gum and its required level. However, concentrations as low as 0.5% and as high as 3.5% actives by weight were found useful for aqueous solutions containing 1.5% by weight of polysaccharide gums. Concentrations as low as 0.5% and as high as 3.0% actives by weight were also found useful for the formulation of low viscosity 3×3 polar-solvent fire-fighting concentrates containing the same amounts of gums. Preferred concentrations of these copolymers for both aqueous polysaccharide gum solution and 3×3 concentrate applications are 1.0–3.5% and 1.0–3.5% actives, respectively, for systems containing 1.0–3.0% by weight polysaccharide gums.

It has also been discovered that the effectiveness of the anionic copolymers of this invention in reducing the viscosity of aqueous polysaccharide gum solutions as well as polar-solvent fire-fighting concentrates is markedly enhanced when they are used in conjunction with a co-oligomer of acrylamide and acrylic acid terminated on one end by a perfluoro-ethyl thioether group. Such co-oligomers are disclosed in co-pending application Ser. No. 07/832,150, now U.S. Pat. No. 5,218,150. One such perfluoroalkyl-terminated co-oligomer, LODYNE K90'90, which is manufactured by Ciba-Geigy Corporation, is especially preferred. This enhancement is very surprising because the perfluoroalkyl-terminated co-oligomers alone have no significant effect on the viscosity of fire-fighting foam concentrates.

The discovery of this synergistic interaction between the copolymers of this invention and the perfluoroalkyl-terminated co-oligomers as described above, although its nature is not clearly understood at this time, is another embodiment of this invention. The concentration of perfluoralkyl-terminated co-oligomer such as LODYNE K90'90 useful for the formulation of reduced viscosity polar-solvent fire-fighting concentrates depends on the amount of polysaccharide gum required. Typically, 2.0–4.0% by weight is used for the 3×3 concentrates containing 1.0–2.0% of polysaccharide gum. Preferably, 2.5–4.0% by weight is employed.

Water soluble, anionic copolymers of the type presently found to be useful in reducing the viscosity of aqueous polysaccharide gum solution and fire-fighting foam concentrates, have been disclosed as useful for other applications. Some examples in the field of non-fire-fighting applications are U.S. Pat. No. 3,658,734, which teaches, for example, that high molecular weight polyacrylamides (neutral, anionic and cationic types) can be used as thickening agents in conjunction with guar gum. A synergistic increase in viscosity of the medium was reported. A method of reducing the aerial drift of aqueous preparations by use of non-aqueous concentrates containing polyacrylamides or copolymers of acrylic acid and methacrylic acid or their salts in conjunction with xanthan gum is disclosed in U.S. Pat. No. 4,610,311. Use of mixtures containing a copolymer of acrylic acid and acrylamide as a thickener for printing ink is disclosed in U.S. Pat. No. 4,585,820. U.S. Pat. No. 4,786,198 discloses shear-thinning ball-point pen ink compositions containing xanthan gum used as a shear-thinning material and "water-soluble" (cross-linked) homopolymers and alkyl ether copolymers of acrylic acid used as binders.

In the area of fire-fighting applications, U.S. Pat. No. 3,354,084 discloses gel compositions wherein water-soluble acrylic copolymers are used as a viscosity enhancer. The enhanced viscosity is claimed to help the gelled water solution not to run off the fuel involved in forest fires. U.S. Pat. No. 4,584,339 discloses that dilatant behavior, in which the viscosity increases with shear rate, was observed in a system containing copolymers of the same nature as disclosed in the present invention in combination with water-soluble cationic copolymers. A potentially advantageous use of this dilatant behavior for fire-fighting is mentioned in the disclosure. British Patent No. 1,071,660 discloses foam compositions for fire-fighting containing an anionic copolymer of acrylamide and acrylic acid which is used as a foam stabilizer. U.S. Pat. No. 3,407,138 discloses compositions which contain a water insoluble, cross-linked copolymer of acrylamide and potassium acrylate for extinguishing and preventing fires of flammable liquids. Such compositions, when swollen with water to form an aqueous gel, float on the surface of a flammable liquid hydrocarbon, such as benzene, kerosene or gasoline, to extinguish the fire. The copolymer system here is used as a water reservoir. British Patent No. 1,435,200 teaches how to formulate fire-fighting compositions containing hydrophilic copolymers of acrylic, methacrylic or maleic acid, wherein the copolymers were disclosed to be useful as a thixotropic thickening agent. Research Disclosure, February 1979, discloses a polar-solvent fire-fighting composition which is not based on polysaccharide gums, wherein an anionic acrylamide polymer is used in conjunction with alkyl cellulose as a foam stabilizer.

None of these patents, regardless of whether they are for fire-fighting or not, which discloses the use of water-soluble copolymers of a similar nature to those disclosed in this invention, uses the copolymers as a viscosity reducer, particularly in polar-solvent fire-fighting foam compositions.

Commercially acceptable 3×3 polar-solvent fire-fighting foam compositions are rather complex mixtures. Low viscosity 3×3 polar-solvent fire-fighting compositions comprising the instant water-soluble copolymers as a new, key component contain:

a. one or more anionic perfluorosurfactants, 0.5–3.0% by weight, preferably 1.0– 2.0%,
b. one or more cationic perfluorosurfactants, 0. 1–2.0% by weight, preferably 0.5– 1.2%,
c. one or more non-ionic or amphoteric perfluorosurfactants, 1.0–4.0% by weight, preferably 2.0–4.0%,
d. one or more non-fluorosurfactants, 8.0 to 25.0% by weight, preferably 18.0–22.0%,
e. a perfluoroalkyl-terminated co-oligomer of acrylamide and acrylic acid, preferably LODYNE K90'90, which is available from Ciba-Geigy Corporation, 0–6.0% by weight, preferably 2.5–4.0%,
f. a water miscible organic solvent as foam booster, 2.0–15.0% by weight, preferably 5.0–10.0%,
g. one or more polysaccharide gums, 1.0–2.0% by weight, preferably 1.2–1.7%,
h. a water-soluble, anionic copolymer of the present invention, 0.5–3.5% (actives) by weight, preferably 1.0–2.0%, and
i. water, 20–50% or in the amount to make up the balance of 100%.

Suitable perfluorosurfactants and non-fluorosurfactants for the formulation of polar-solvent fire-fighting foam concentrates are disclosed, for example, in U.S. Pat. Nos. 4,420,434, 4,999,119 and 5,085,786. U.S. Pat. Nos. 4,424, 133, 4,859,349 and 4,999,119 disclose polysaccharide gums useful in aqueous fire-fighting compositions for fighting polar solvent fires.

The 3×3 polar-solvent fire-fighting foam compositions of the present invention are employed in the usual way to fight fires of either nonpolar hydrocarbon fuels or polar solvent. The concentrates are proportioned (diluted) through an eductor which rapidly picks up and mixes 3 parts of the concentrate with 97 parts of water to form a "premix". This premix solution, when aerated through a foam-generating nozzle, readily forms an effective fire-fighting foam having a foam expansion ratio of 5 to 8. Foam is generally applied directly to the burning fuel.

The viscosity of the polar-solvent fire-fighting compositions was found to be directly related to the level of the copolymer in the composition. The copolymers have been surprisingly found to be able to decrease the viscosity of the compositions without affecting the degree of swelling of the polysaccharide gum particles. This important viscosity reducing property is in sharp contrast to the effects of the inorganic salts or solvents mentioned above in that the latter agents control the viscosity of the polysaccharide gum solution by inhibiting the swelling of the gum particles. The lack of proper swelling of the gum particles in the latter cases leads to their precipitation on standing for a short time. The limited swelling of the prior art gum particles is evident from the coarse, grainy appearance of the formulated concentrates and also from the appearance of the premix (dilution) of the concentrate. The gum particles in a premix solution remain visibly grainy and solid-like, and do not easily dissolve in the solution. The lack of ready dissolution of the gum particles at the premixing stage obviously lead to the formation of a poor quality membrane and to poor fire-fighting performance.

Polysaccharide gum particles, the swelling of which is not hindered in the case of the copolymer-containing polar-solvent fire-fighting concentrate, although not as swollen as those without any viscosity reducing agent at all, were found to be readily soluble in the premix solution. This ready dissolution of the gum particles at the premixing or proportioning stage is found to greatly improve the fire-fighting effectiveness.

The synthesis of water-soluble, anionic copolymers which are the key new ingredients for the formulation of low viscosity, aqueous solutions of polysaccharide gums and 3×3 polar-solvent fire-fighting foam concentrates is accomplished by free-radical initiated polymerization of the monomers of $M_1$, $M_2$ and, optionally, $M_3$ in bulk or in solution, preferably in aqueous solution, optionally in the presence of organic solvents such as alcohols or ketones, and preferably at a pH between 4 and 8. Preferred amounts of the respective monomers to employ were discussed earlier. The copolymerization is initiated by free-radical generating initiators, such as peroxides, persulfates or azo compounds, or redox initiation systems at temperatures from 10° C. to 100° C. It is advantageous to use a chain transfer agent during the polymerization in order to control the molecular weight of the polymer. Typical chain-transfer agents useful for this invention are thiols, such as $C_4$–$C_{20}$-alkylmercaptans, preferably those soluble in water, such as mercaptoglycerol, mercaptoethanol, mercaptosuccinic acid, mercaptoacetic acid and 2- or 3-mercaptopropionic acid. In general, the polymerization reactions can be carried out under a wide variety of conditions, i.e. temperature ranges, amounts and types of initiators and chain-transfer agents and reaction times, by anyone skilled in the art of free-radical polymerization.

Detailed descriptions of the synthesis of various useful copolymers are given in the following Examples. No chain transfer agent was used in the first example. These examples are merely illustrative and are not to be considered limiting.

EXPERIMENTAL PART

Copolymer Synthesis and Test Results

The following laboratory and field test methods were used:
Viscosity
All viscosities were measured at room temperature using a Model DV-I Brookfield viscometer with a No. 4 spindle at 30 rpm.
Static and Dynamic Foam Stability
Fire fighting compositions for polar solvents generally contain polymeric materials that form a membrane on the surface of a polar solvent. It is this membrane that prevents the foam from rapidly dissolving into the solvent and consequently being destroyed. Be, cause of this direct interaction between the polar solvent and the foam, the conventional, laboratory foam quality test of Foam Expansion Ratio (FXR) and Quarter Drain Time (QDT), which many fire-fighting foam agent specifications such as UL 162 require, do not provide a realistic measure of the foam quality of polar-solvent fire-fighting compositions. These static foam qualities are, however, generally well accepted as important properties of fire-fighting compositions for non-polar solvents and fuels, such as AFFFs and fluoroproteins. In an effort to simulate the dynamic flow conditions and the direct interaction between a foam and a polar solvent fuel in a field test situation (as specified in UL 162), a dynamic foam stability test was developed. In this test, foam is applied indirectly to the polar solvent through a guide tube and allowed to slide across the surface of the solvent, much akin to the UL fire test where the foam is indirectly discharged to the fuel through a backboard and allowed to spread and fight the fire. Foams of fire-fighting compositions which are not designed for polar solvents such as AFFFs and fluoroproteins are destroyed instantly when they come in contact with a water-miscible polar solvent such as isopropyl alcohol or acetone.

The procedure for the dynamic foam stability test on a polar solvent is as follows: A 75 ml sample of appropriate premix solution (a dilution to a 3 or 6% of a polar fire-fighting composition) is loaded into a foam generator. The foam is discharged through a glass guide tube onto 250 ml of hot isopropyl alcohol or acetone held in a 25 cm×16 cm glass pan. The foam is applied through the guide tube in such a way that it spreads over and across the solvent from one end of the pan to the other and completely covers the surface of the solvent. The time required for 50% of the foam area to collapse from the moment the foam touches the solvent is recorded. This value is termed the "foam life". It is believed to be the most realistic laboratory measurement of foam stability under dynamic conditions in the presence of a solvent.

Fire Tests

Large scale fire tests were carried out according to the UL 162 standard (5th Edition). The UL fire tests on both acetone and isopropyl alcohol (IPA) were conducted in a 50 ft$^2$ pan using the Type II application method. The foam application rates were 4.5 gallons per minute throughout.

EXAMPLE 1

Into a 5 liter reactor equipped with a gas inlet, condenser, thermometer, stirrer and a water jacket are charged 1584 g de-ionized water and 37.2 g (0.465 moles) 50% NaOH solution, followed by 40 g (0.465 moles ) methacrylic acid (MAA) and 160 g (1.61 moles) N,N-dimethylacrylamide (DMA). The comonomer ratio in this instance represents 1 mole of MAA to 3.45 moles of DMA, or 20% by weight MAA to 80% DMA. The solution is evacuated, purged with nitrogen gas and stirred in order to eliminate the residual oxygen. 1 g (0.0037 moles) 2,2-azobis(2-amidinopropane) dihydrochloride ("V-50" from Wako Chemicals U.S.A. Inc.) are added and the jacket temperature is set at 75° C. An exotherm develops and the temperature reaches about 85° C. Total reaction time is four hours. The solution is then cooled to 30° C. and discharged into a container. The product is a clear and colorless 12% copolymer solution in water, and has a typical viscosity of 1000 cP at 25° C. Coy Model DV-I Brookfield viscometer/with spindle No. 4 at 30 rpm), a pH of 7 and weight-average molecular weight of 2.5×10$^5$ as determined by gel-permeation chromatography (GPC).

EXAMPLE 2

Into a 12 liter reactor equipped with a gas inlet, condenser, thermometer, stirrer, and a water jacket are charged 7400 g de-ionized water and 265 g (6.62 moles) of NaOH, followed by 600 g (6.97 moles) methacrylic acid (MAA) and 2400 g (24.2 moles) N,N-dimethylacrylamide (DMA). The pH of the solution is about 6.5. 4.25 g (0.04 moles) 3-mercaptopropionic acid is then added. The solution is evacuated, purged with nitrogen gas and stirred in order to eliminate residual oxygen. 15.0 g (0.055 moles) of 2,2-azobis(2-amidinopropane) dihydrochloride are added and the jacket temperature is set at 50° C. An exotherm develops and the temperature reaches about 90° C. After the peak exotherm has occurred, the jacket temperature is raised to 75° C. and held there for four hours. The solution is then discharged at 75° C. into a container. The product is a clear and colorless 30% copolymer solution in water containing radicals derived from MAA and DMA in a mole ratio of 1 to 3.45. The viscosity of this copolymer is typically 10,000 cP. The weight-average molecular weight is typically around 1.0× 10$^5$ determined by GPC.

EXAMPLES 3–12

Following the general procedure of Example 1, additional examples of copolymers were synthesized for laboratory evaluation. They are listed in Table 1. Also included in the table are the previous two copolymer examples and a commercial anionic polymer, Cyanamer A-100L.

EXAMPLES 13 AND 14

Into 200 cc screw-cap bottle are added in the following order 95.0 g de-ionized water and 1.47 g (0.0367 moles) NaOH; after dissolution are added in the following order 10.0 g (0.141 moles) acrylamide (AM), 3.33 g (0.0387 moles) methacrylic acid (MAA), 3.33 g (0.0333 moles) methyl methacrylate (MMA), 0.083 g (0.0008 moles) 3-mercaptopropionic acid, and 0.083 g (0.5% by weight) V-50. A magnetic stirring bar is placed into the bottle and the mixture is degassed by applying vacuum and sparged with nitrogen. The bottle is closed and the contents are stirred in a glycol bath at 65° C. for 8 hours. The resulting product (Example 13) is a 14.6% copolymer solution in water containing radicals derived from MAA, AM and MMA in a molar ratio of 1.0/4.2/1.2 or in a weight percent ratio of 20/60/20.

Following the same procedure and the same monomer mole ratio, a low molecular weight copolymer is prepared using a larger amount of chain-transfer agent (0.166 moles). The product (Example 14) is a clear, 14.2% copolymer solution in water having a viscosity of 380 cP.

EXAMPLES 15–16

Using the same procedure as Example 13, a copolymer containing radicals derived from MAA, AM and MMA in a molar ratio of 1.0/3.5/1.8 or in a weight percent ratio of 20/50/30 is prepared This product (Example 15) is a cloudy solution in water containing 14.1% solids.

A copolymer containing radicals derived from MAA, AM and MA (methyl acrylate) in a weight percent ratio of 20/50/30 is also prepared using the same procedure. The product (Example 16) is a hazy solution containing 24.8% of solids.

EXAMPLE 17

Into a 100 cc flask equipped with a gas inlet, condenser, thermometer and stirrer are charged 20 g dry methyl ethyl ketone (MEK) and 2.50 g (0.0255 moles) maleic anhydride. After all the anhydride has dissolved, 14.2 g (0.430 moles) of N,N-dimethylacrylamide (DMA) are added together with 0.416 g (0.25% by weight) dodecylmercaptan and 0.920 g (0.5% by weight) V-50. The mixture is degassed and sparged with nitrogen, then stirred at 60° C. for 24 hours. The mixture after being cooled to room temperature, is dissolved in 20 g of water followed by 2.04 g (0.051 moles) NaOH. The contents are stirred at 50° C. for 5 hours; then the MEK is stripped off on a Rotovap. A yellowish, 35% aqueous solution of a copolymer of maleic acid radicals derived from (MAC) and DMA is obtained, containing MAC and DMA in a molar ratio of 1.0/5.6 or in a weight percent ratio of 15/85.

Examples 13–17 containing three co-monomers are also listed in Table 1.

TABLE 1

| Example No. | Copolymer | Composition, % by weight | | |
|---|---|---|---|---|
| | | $M_1$ | $M_2$ | $M_3$ |
| 1 | MAA:DMA | 20 | 80 | — |
| 2 | MAA:DMA | 20 | 80 | — |
| 3 | DMA | — | 100 | — |
| 4 | MAA:DMA | 10 | 90 | — |
| 5 | MAA:DMA | 30 | 70 | — |
| 6 | MAA:DMA | 50 | 50 | — |
| 7 | MAA | 100 | — | — |
| 8 | AA:DMA | 20 | 80 | — |
| 9 | MAA:AM | 20 | 80 | — |
| 10 | MAA:NVP | 20 | 80 | — |
| 11 | MAA:NVP | 10 | 90 | — |
| 12 | Cyanamer A-100L | — | — | — |
| 13 | MAA:AM:MMA | 20 | 60 | 20 |
| 14 | MAA:AM:MMA | 20 | 60 | 20 |
| 15 | MAA:AM:MMA | 20 | 50 | 30 |
| 16 | MAA:AM:MA | 20 | 50 | 30 |
| 17 | MAC:DMA | 15 | 85 | — |

Abbreviations: DMA (N,N-Dimethylacrylamide); MAA (Methacrylic acid); AA (Acrylic acid); AM (Acrylamide); MA (methyl acrylate); MMA (Methyl methacrylate); NVP (N-vinylpyrrolidone); MAC (Maleic acid).

Low viscosity aqueous polysaccharide gum solutions were prepared using the following composition.

TABLE 2

| Component | Percent by weight |
|---|---|
| Polysaccharide gum | 1.5 |
| Anionic copolymer | 1.5 |
| LODYNE K90'90 (if used) | 3.6 |
| Butyl carbitol | 5.0 |
| water | remainder |

The polysaccharide gums used in the above composition are: A (rhamsan gum), B (xanthan gum), C (special blend), D (xanthan gum), E (xanthan gum) and F (xanthan gum), all from Kelco Company, a division of Merck & Co., Inc. and G (xanthan gum) and H (xanthan gum), both from Rhone Poulenc. LODYNE K90'90, a 35% active solution of a perfluoroalkyl-terminated co-oligomer of acrylic acid and acrylamide is manufactured by Ciba-Geigy Corporation.

Unless otherwise noted, 3×3 polar-solvent fire-fighting concentrates were prepared for evaluation using the compositions presented in the following table.

TABLE 3

| Component | Percent by weight |
|---|---|
| LODYNE S-103A | 1.6 |
| LODYNE S-106A | 0.9 |
| LODYNE K78'220B | 3.4 |
| LODYNE K90'90 | 3.6 |
| Deriphat 160C | 16.0 |
| Sipex OLS | 1.8 |

TABLE 3-continued

| Component | Percent by weight |
|---|---|
| Triton X-102 | 0.8 |
| Butyl carbitol | 5.0 |
| Polysaccharide gum | 1.5 |
| Copolymers | variable |
| Water | remainder |

The perfluorosurfactants and non-fluorosurfactants used in these concentrates are: LODYNE S-103A, a 45% active solution of an anionic perfluorosurfactant $R_fCH_2CH_2SCH_2CH_2CONHC(CH_3)_2CH_2SO_3Na$, wherein $R_f$ indicates perfluoroalkyl homologs consisting mainly of $C_6F_{13}$, manufactured by Ciba-Geigy Corporation; LODYNE S-106A, a 30% active solution of a cationic perfluorosurfactant, $R_fCH_2CH_2SCH_2CH(OH)CH_2N^+(CH_3)_3Cl^-$, wherein $R_f$ is mainly $C_6F_{13}$, manufactured by Ciba-Geigy Corporation; LODYNE K78'220B, a 40% active solution of a nonionic perfluorosurfactant, $R_fCH_2CH_2S[CH_2CH(CONH_2)]_{15}H$, wherein $R_f$ is mainly $C_8F_{17}$, manufactured by Ciba-Geigy Corporation; Deriphat 160C, a 30% active solution of an amphoteric non-fluorosurfactant, $C_{12}H_{25}N(CH_2CH_2COOH)CH_2CH_2CO_2Na$, manufactured by Henkel Corporation; Sipex OLS, a 33% active solution of n-octylsulfate manufactured by Alcolac, Inc, and Triton X-102, a 100% active n-octylphenol ethoxylate manufactured by Rohm and Haas Company.

The following method of preparation was employed for the formulation of low viscosity aqueous polysaccharide gum solutions.

1. The water-soluble copolymer (component h) is first dissolved in the total amount of water, followed by LODYNE K90'90 (component e) if used.
2. In a separate container a polysaccharide gum slurry is made in butyl carbitol by evenly dispersing the gum particles in 80% of the full amount (5% by weight) of the solvent. The slurry is then added to the above mixture and it is stirred at a low shear rate to minimize air entrapment and foaming. The remaining butyl carbitol is used to rinse any remaining slurry into the solution.
3. The mixture is stirred until a stable viscosity is reached.

Such reduced viscosity aqueous polysaccharide solutions are useful as antiredeposition agents in liquid detergent compositions wherein low viscosity is desired. They are also useful in printing ink formulations. They are most useful, however, as intermediate to formulate reduced viscosity polar-solvent fire-fighting foam concentrates, especially 3×3 formulations.

The following method of preparation was used to formulate low viscosity 3×3 polar-solvent fire-fighting foam concentrates.

1. The water-soluble copolymer (component h) is first dissolved in the total amount of water, followed by LODYNE K90'90 (component e).
2. All the surfactants are added to the solution, which is then mixed thoroughly without creating foam.
3. In a separate container a polysaccharide gum slurry is made in butyl carbitol by evenly dispersing the gum particles in 80% of the full amount (5% by weight) of the solvent. The slurry is then added to the above mixture and it is stirred at a low shear rate to minimize air entrapment and foaming. The remaining butyl carbitol is used to rinse any remaining slurry into the solution.

4. The mixture is stirred until a stable viscosity is reached.

Alternatively, reduced viscosity polar-solvent fire-fighting concentrates can be prepared by adding the polysaccharide gum slurry to the copolymer solution before adding the surfactants, in other words, following the steps in the order 1-3-2-4 instead of 1-2-3-4 as described above.

The following examples summarize the results of both laboratory and field fire tests conducted to demonstrate the usefulness of this invention.

EXAMPLE 18

This example shows the viscosity-reducing effects of the anionic copolymer of Example 1, used at 1.5% actives, on aqueous solutions of various polysaccharide gums prepared as described above. The level of LODYNE K90'90 used in this example is 3.6%. Hereafter, all the anionic copolymer concentrations are expressed in percent active ingredient. Test results are summarized in the following table.

TABLE 4

| Polysaccharide | without copolymer ("blank") | Viscosity (cP) with copolymer | with copolymer and LODYNE K90'90 |
|---|---|---|---|
| A/B(50/50) | 4300 | 1900 | 500 |
| C | 6000 | 2200 | 1320 |
| D | 6000 | 1420 | 580 |
| E | 5620 | 1400 | 500 |
| F | 5220 | 1660 | 240 |
| G | 8000 | 2400 | 1260 |
| H | 6260 | 2600 | 1020 |

These results amply demonstrate that the water soluble, anionic copolymers of the present invention greatly reduce the viscosity of concentrated aqueous polysaccharide gum solutions, and that the effect is general and applicable to different types of polysaccharide gums, although the degree of viscosity reduction differs. The "blank" in Table 4 contains neither the viscosity-reducing anionic copolymers (component h) nor LODYNE K90'90 (component d) but 5% butyl carbitol. Also clearly demonstrated by these data is the synergistic effect of combining LODYNE K90'90 with the viscosity-reducing copolymers. Up to a 25-fold reduction in viscosity is observed in the presence of LODYNE K90'90 without a stability problem. This is surprising since it does not have a significant viscosity-reducing effect by itself. For example, the viscosity of an aqueous solution containing a blend of gums A and B (50/50) and only LODYNE K90'90 without any copolymer is 4150 cP, which should be compared with 4300 cP in Table 4.

EXAMPLE 19

This example, as summarized in Table 5, illustrates the viscosity-reducing effects of various anionic copolymers on 3×3 polar-solvent fire-fighting foam concentrates prepared using the composition shown in Table 3. All the copolymers were used at 1.5% unless noted otherwise. The amount of polysaccharide gum used in the 3×3 concentrates was 1.5% by weight. The polysaccharide gum blends presented in Table 5 are all 50/50 mixtures of the individual gums.

TABLE 5

| Copolymer Example | Gum | Viscosity (cP) | Stability |
|---|---|---|---|
| Without copolymer | A/B | 4300 | stable |

TABLE 5-continued

| Copolymer Example | Gum | Viscosity (cP) | Stability |
|---|---|---|---|
| " | A/D | 4500 | " |
| " | E | 5600 | " |
| " | F | 5600 | " |
| No. 1 | A/B | 500 | " |
| " | A/D | 840 | " |
| " | E | 500 | " |
| No. 2 | F | 200 | " |
| No. 3 | A/B | 3600 | stable |
| No. 4 | A/B | 2200 | " |
| " | A/D | 1080 | " |
| No. 5 | A/B | 1200 | " |
| " | A/D | 1200 | " |
| No. 6 | A/B | 1000 | " |
| " | A/D | 1000 | " |
| " | A/B | 80 | unstable |

TABLE 5-continued

| Copolymer Example | Gum | Viscosity (cP) | Stability |
|---|---|---|---|
| No. 8 (@1.0%) | A/B | 920 | stable |
| " | A/B | <50 | unstable |
| No. 9 | A/B | 3400 | stable |
| No. 9 (@3.0%) | A/B | 280 | unstable |
| No. 10 | E | 140 | stable |
| No. 10 (@1.2%) | E | 540 | " |
| No. 11 | E | 460 | " |
| No. 12 | A/B | 1400 | " |
| No. 12 (@1.8%) | A/B | 560 | " |
| No. 13 | F | 960 | " |
| No. 14 | F | 200 | " |
| No. 15 (@0.8%) | E | 1460 | " |
| No. 15 (@1.2%) | E | 200 | " |
| No. 16 (@1.0%) | F | 2340 | " |
| No. 17 | E | 1640 | " |

EXAMPLE 20

The viscosity-reducing effectiveness was found to be a critical function of the concentration of the anionic copolymer. The following table summarizes the test results with 3×3 fire-fighting foam concentrates containing the copolymers of Examples 1 and 2. It is clearly demonstrated that reduced-viscosity, stable 3×3 formulations can be prepared with a copolymer concentration ranging from 1.2 to 1.5% depending on the gums used.

TABLE 6

| Copolymer (% actives) | Viscosity (cP) | | |
|---|---|---|---|
| None | 4300 | 5600 | 5600 |

TABLE 6-continued

| Copolymer (% actives) | Viscosity (cP) | | |
|---|---|---|---|
| 0.5 | 3300 | — | — |
| 1.0 | 2000 | 1580 | — |
| 1.2 | — | 460 | 1800 |
| 1.3 | — | 200 | — |
| 1.4 | — | 60 | 500 |
| 1.5 | 300 | — | — |
| Copolymer | Example 1 | Example 2 | Example 1 |
| Gum | A/B(50/50) | E | F |

EXAMPLE 21

Laboratory test results on both the viscosity and dynamic foam stability (foam life) are summarized in the following table. The viscosity was measured on the 3×3 fire-fighting foam concentrates which contain 1.5% copolymers and 1.5% polysaccharide gum blend A/B (50/50), whereas the static and dynamic foam properties (foam life) were measured on a premixed solution containing 3 parts of concentrate and 97 parts of artificial sea (salt) water.

TABLE 7

| Concentrate (Example No.) | Viscosity (cP) | FXR/QDT (min) | Foam life (min) | | Stability |
|---|---|---|---|---|---|
| | | | IPA | Acetone | |
| Reference (w/o copolymer) | 4300 | 7.0/12.0 | 12.5 | 29.0 | stable |
| w/ No. 1 | 400 | 6.8/12.5 | 13.0 | >60 | " |
| w/ No. 5 | 220 | 6.8/11.2 | 16.0 | >60 | " |
| w/ No. 5 (different batch) | 500 | 6.9/12.5 | 16.0 | >60 | " |
| w/ No. 6 | 1200 | 6.9/14.0 | 17.0 | >60 | " |
| w/ No. 7 | 1000 | 6.8/11.0 | 12.5 | >60 | " |
| w/ No. 9 | 3400 | 6.8/12.0 | 4.0 | 30 | " |
| w/ No. 12 | 1400 | 7.0/12.5 | 7.4 | 60 | " |
| w/ No. 12 (@1.8%) | 560 | 7.0/12.5 | 3.7 | 25 | " |
| w/ No. 14 | 200 | 7.0/11.0 | 4.0 | 60 | " |

Abbreviations: FXR (Foam Expansion Ratio); QDT (Quarter drain Time).

This example amply demonstrates that extremely low viscosity 3×3 polar-solvent fire-fighting concentrates can be prepared using the copolymers of this invention. As indicated in the table, these low viscosity formulations are also stable. Significant improvement on the dynamic foam stability (foam life) due to the copolymers is also noted, especially on acetone. The "stability" in both Table 5 and 7 indicates the dispersion stability of the 3×3 concentrates: "stable" means that the concentrate remained homogeneous without any indication of phase separation when stored and checked at room temperature after one month. "Unstable" indicates phase separation of the concentrate (gum particles settled) after either overnight standing or at any time within one month.

EXAMPLE 22

This example demonstrates the viscosity reducing effects of the copolymer of Example 1 on the viscosity of 3×3 fire-fighting foam concentrates containing polysaccharide gum E, and the foam properties of their 3% premix solutions in salt water. The level of copolymer in this instance was 1.5%.

TABLE 8

| Copolymer (Batch No.) | Viscosity (cP) | FXR/QDT (min) | Foam life (min) | | Stability |
|---|---|---|---|---|---|
| | | | IPA | Acetone | |
| Reference (w/o copolymer) | 4300 | 7.0/12.0 | 12.0 | 29 | stable |
| Sample A (pH 9.5) | 280 | 6.7/12.3 | 10.0 | 60 | stable |
| Sample A (pH = 11.0) | 340 | 6.7/12.5 | 9.5 | 60 | stable |
| Sample B | 420 | 7.1/11.5 | 10.5 | 45 | stable |
| Sample C | 380 | 7.1/12.0 | 10.3 | 45 | stable |

Abbreviations: FXR (Foam Expansion Ratio); QDT (Quarter Drain Time).

As shown in Table 8, the copolymer of Example 1 provides a viscosity range of 280–420 cP in the 3×3 compositions containing polysaccharide gum E. It was also observed that this gum gave a smoother and clearer look to the final concentrate than that of the gum blend A/B (Table 7). Both Tables 6 and 7 show that the foam life on both acetone and IPA is markedly improved by the copolymers of this invention.

EXAMPLE 23

This example demonstrates that the low viscosity polar-solvent fire-fighting foam concentrates prepared with the water-soluble, anionic copolymers of this invention perform very well in full scale fire tests, as predicted based on the laboratory foam life test results. The 3×3 concentrates used for the fire tests contained one of the most preferred copolymers, DMA:MAA (80:20) (Example No. 1), at the level of 1.5%. The effectiveness of this copolymer was tested in two different 3×3 concentrates containing polysaccharide gums, A/B (50/50) and E. The viscosities of these concentrates were 500 and 700 cP, respectively. Fire tests were run in both fresh and salt water using a UL nozzle at a foam application rate of 4.5 gallon per minute. Test parameters used in the UL fire test such as control time (abbreviated here as CT), extinguishment time (XT), etc. are defined in the UL Standard. As summarized in the following table, excellent results all far exceeding the UL specifications were obtained with both acetone and IPA.

TABLE 9

| Formulation | CT | XT | BB (@5 min) | FXR/QDT | Note |
|---|---|---|---|---|---|
| w/ Gum A/B (viscosity:500 cP) | 1:36 | 3:30 | 6% | 5.8/15:19 | Salt water/IPA |
| | 1:16 | 2:41 | SE | 5.7/25:43 | Fresh water/IPA |
| | :56 | 4:06 | 2% | — | Salt water/Acetone |
| | :45 | 5:34 | SE | — | Fresh water/Acetone |

TABLE 9-continued

| Formulation | CT | XT | BB (@5 min) | FXR/QDT | Note |
|---|---|---|---|---|---|
| w/ Gum E | 1:38 | 3:21 | 3% | 5.6/18:39 | Salt water/IPA (viscosity:700 cP) |
|  | :47 | 3:20 | SE | 6.0/25:00 | Fresh water/Acetone |
| Specification | — | <5:00 | <10% | — | — |

Abbreviations: CT (Control Time); XT (Extinguishment Time); BB (Burback); FXR (Foam Expansion Ratio); QDT (Quarter Drain Time); SE (Self-Extinguishment).

We claim:

1. A reduced viscosity aqueous polar-solvent fire-fighting foam concentrate which comprises 1.0 to 3.0% by weight of a polysaccharide gum and a viscosity-reducing amount of 1.0 to 3.5% by weight of a water-soluble, anionic copolymer, wherein said copolymer has a weight average molecular weight of from 10,000 to 250,000 mass units and has units of the formula

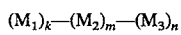

in which

M₁ is a radical of a vinyl mono- or dicarboxylic acid or a salt thereof,

M₂ is a radical of a water-soluble acrylamide, methacrylamide or vinylamide,

M₃ is a radical of one or more other copolymerizable monomers selected from the group consisting of acrylates, methacrylates, vinyl esters, vinyl ethers and styrene, k is 0.05 to 0.50 and is <m, m is 0.30 to 0.95 and n is 0 to 0.50, where k, m and n are the weight fractions of the respective monomers, and the sum of k+m+n is 1.00.

2. A composition according to claim 1 which is a 3×3 polar-solvent fire-fighting foam concentrate.

3. A composition according to claim 1 wherein M₁ is a radical of maleic acid, M₂ is a radical of N,N-dimethylacrylamide or N-vinylpyrrolidone, M₃ is a radical of styrene or methylmethacrylate, k is 0.05 to 0.30, m is 0.50 to 0.95 and n is 0.0 to 0.30.

4. A composition according to claim 1 wherein

M₁ is a radical of acrylic acid, methacrylic acid, maleic, fumaric or itaconic acid, or a salt thereof, M₂ is a radical of acrylamide, methacrylamide, N-methylacrylamide, N-ethylacrylamide N-methylmethacrylamide, N,N-dimethylacrylamide, N,N-diethylacrylamide, N,N-dimethylethylacrylamide, N-propylacrylamide, N-isopropylacrylamide, N-vinylpyrrolidone, N-vinylacetamide, N-(hydroxymethyl)-acrylamide, N-(3-hydroxypropyl)-acrylamide or N-(2-hydroxyethyl)-methacrylamide, or a mixture thereof, and M₃ is a radical of a linear or branched C₁–C₈-alkylacrylate or -methacrylate or a C₃–C₇-cycloaliphatic acrylate or-methacrylate, phenyl acrylate, benzyl acrylate, vinyl acetate, vinyl propionate, methyl, ethyl or butyl vinyl ether, styrene or alpha-methyl styrene, or a mixture thereof.

5. A composition according to claim 4 which is a 3×3 polar-solvent fire-fighting foam concentrate.

6. A composition according to claim 4 wherein M₁ is a radical of acrylic or methacrylic acid, M₂ is a radical of acrylamide, N,N-dimethylacrylamide or N-vinylpyrrolidone and M₃ is a radical of methyl methacrylate, methyl acrylate or styrene.

7. A composition according to claim 6 which is a 3×3 polar-solvent fire-fighting foam concentrate.

8. A composition according to claim 1 wherein M₁ is a radical of acrylic or methacrylic acid, M₂ is a radical of N,N-dimethylacrylamide or N-vinylpyrrolidone, k is 0.10 to 0.30 and m is 0.70 to 0.90, and the sum of k and m is 1.00.

9. A composition according to claim 8 wherein M₁ is a radical of methacrylic acid, M₂ is a radical of N,N-dimethylacrylamide, k is 0.15 to 0.25 and m is 0.85 to 0.75 and the sum of k and m is 1.00.

10. A composition according to claim 1 wherein M₁ is a radical of acrylic or methacrylic acid, M₂ is a radical of acrylamide, M₃ is a radical of a C₁–C₄-alkyl acrylate or methacrylate, or styrene, k is 0.10 to 0.30, m is 0.35 to 0.80 and n is 0.0 to 0.45.

11. A composition according to claim 10 wherein M₁ is a radical of methacrylic acid, M₂ is a radical of acrylamide, M₃ is a radical of methyl acrylate or methacrylate, k is 0.15 to 0.25, m is 0.40 to 0.70 and n is 0.15 to 0.40.

12. A composition according to claim 1 which further comprises a viscosity-reducing amount of a co-oligomer of acrylamide and acrylic acid terminated on one end by a C₆–C₂₀-perfluoroalkyl-ethyl thioether group.

13. A composition according to claim 12 wherein the co-oligomer of acrylamide and acrylic acid terminated on one end by a C₆–C₂₀-perfluoroalkyl-ethyl thioether group is present in an amount of 1.0 to 4.0%.

14. A composition according to claim 12 wherein

M₁ is a radical of acrylic acid, methacrylic acid, maleic, fumaric or itaconic acid, or a salt thereof, M₂ is a radical of acrylamide, methacrylamide, N-methylacrylamide, N-ethylacrylamide N-methylmethacrylamide, N,N-dimethylacrylamide, N,N-diethylacrylamide, N,N-dimethylethylacrylamide, N-propylacrylamide, N-isopropylacrylamide, N-vinylpyrrolidone, N-vinylacetamide, N-(hydroxymethyl)-acrylamide, N-(3-hydroxypropyl)-acrylamide or N-(2-hydroxyethyl)-methacrylamide, or a mixture thereof, and M₃ is a radical of a linear or branched C₁–C₈-alkylacrylate or -methacrylate or a C₃–C₇-cycloaliphatic acrylate or -methacrylate, phenyl acrylate, benzyl acrylate, vinyl acetate, vinyl propionate, methyl, ethyl or butyl vinyl ether, styrene or alpha-methyl styrene, or a mixture thereof.

15. A composition according to claim 12 which is a 3×3 polar-solvent fire-fighting foam concentrate.

16. A reduced viscosity 3×3 polar-solvent fire-fighting foam concentrate according to claim 2, which comprises:

a. 1.0–2.0% by weight of one or more anionic perfluorosurfactants, b. 0.5–1.2% by weight of one or more cationic perfluorosurfactants, c. 2.0–4.0% by weight of one or more non-ionic or amphoteric perfluorosurfactants, d. 18.0–22.0% by weight of one or more non-fluorosurfactants, e. 0–6.0% by weight of a $C_6$–$C_{20}$-perfluoroalkyl-terminated co-oligomer of acrylamide and acrylic acid terminated on one end by a $C_6$–$C_{20}$-perfluoroalkylethyl thioether group, f. 5.0–10.0% by weight of a water-miscible organic solvent as foam booster, g. 1.2–1.7% by weight of one or more polysaccharide gums, h. 1.0–3.5% by weight of a water-soluble, anionic copolymer according to claim 1, and, i. water, 20–50%, or in the amount to make up the balance of 100%.

17. A composition according to claim 16 which comprises 2.5–4.0% by weight of said $C_6$–$C_{20}$-perfluoroalkyl-terminated co-oligomer of acrylamide and acrylic acid and 1.0 to 2.0% by weight of said water-soluble anionic copolymer.

18. A composition according to claim 17 wherein $M_1$ is a radical of methacrylic acid, $M_2$ is a radical of N,N-dimethylacrylamide, k is 0.15 to 0.25 and m is 0.85 to 0.75 and the sum of k and m is 1.00.

19. A composition according to claim 17 wherein $M_1$ is a radical of methacrylic acid, $M_2$ is a radical of acrylamide, $M_3$ is a radical of methyl acrylate or methacrylate, k is 0.15 to 0.25, m is 0.40 to 0.70 and n is 0.15 to 0.40.

* * * * *